United States Patent [19]

Goodwin

[11] Patent Number: 5,328,768
[45] Date of Patent: Jul. 12, 1994

[54] DURABLE WATER REPELLANT GLASS SURFACE

[75] Inventor: George B. Goodwin, Mars, Pa.

[73] Assignee: PPG Industries, Inc., Pittsburgh, Pa.

[21] Appl. No.: 799,807

[22] Filed: Nov. 29, 1991

Related U.S. Application Data

[63] Continuation-in-part of Ser. No. 589,235, Sep. 28, 1990, which is a continuation-in-part of Ser. No. 503,587, Apr. 3, 1990, Pat. No. 4,983,459.

[51] Int. Cl.$^5$ .............. B32B 9/00; B05D 3/02
[52] U.S. Cl. .................. 428/428; 428/429; 428/447; 428/448; 427/384; 427/387; 427/389.7; 427/397.7
[58] Field of Search .............. 428/428, 429, 447, 453, 428/448; 427/384, 387, 389.7, 397.7, 165; 106/287.13, 187.14, 187.27, 901

[56] References Cited

U.S. PATENT DOCUMENTS

| | | | |
|---|---|---|---|
| 2,553,314 | 5/1951 | Haber | 428/429 |
| 3,950,588 | 4/1976 | McDougal | 428/288 |
| 4,180,618 | 12/1979 | Alpha et al. | 428/428 |
| 4,188,444 | 2/1980 | Landau | 428/428 |
| 4,263,371 | 4/1981 | Franz | 428/432 |
| 4,276,350 | 6/1981 | Franz | 428/410 |
| 4,301,197 | 11/1981 | Franz et al. | 427/353 |
| 4,472,510 | 9/1984 | January | 501/12 |
| 4,478,909 | 10/1984 | Taniguchi et al. | 428/331 |
| 4,529,657 | 7/1985 | Franz | 428/410 |
| 4,816,333 | 3/1989 | Lange et al. | 428/331 |
| 4,879,345 | 11/1989 | Connelly et al. | 525/104 |
| 4,983,459 | 1/1991 | Franz et al. | 428/410 |
| 4,997,684 | 3/1991 | Franz et al. | 427/384 |
| 5,071,709 | 12/1991 | Berquier et al. | 428/447 |

FOREIGN PATENT DOCUMENTS

| | | |
|---|---|---|
| 58-172244 | 10/1983 | Japan . |
| 58-172245 | 10/1983 | Japan . |
| 58-211701 | 12/1983 | Japan . |
| 59-222272 | 12/1984 | Japan . |
| 2230260 | 10/1990 | United Kingdom . |

OTHER PUBLICATIONS

Primary Examiner—Paul J. Thibodeau
Assistant Examiner—H. Thi Le
Attorney, Agent, or Firm—Donna L. Seidel

[57] ABSTRACT

A method and article are disclosed wherein a glass substrate is provided with a more durable non-wetting surface by treatment with a perfluoroalkyl alkyl silane and a fluorinated olefin telomer on a surface which comprises a silica primer layer.

20 Claims, No Drawings

DURABLE WATER REPELLANT GLASS SURFACE

CROSS REFERENCE TO RELATED APPLICATION

This application is a continuation-in-part of U.S. application Ser. No. 07/589,235 filed Sep. 28, 1990, now pending which in turn is a continuation-in-part of U.S. application Ser. No. 07/503,587 filed Apr. 3, 1990, U.S. Pat. No. 4,983,459.

BACKGROUND

The present invention relates generally to the art of surface treatment and, more particularly, to the art of producing a durable water repellent surface on glass substrates.

THE PRIOR ART

U.S. Pat. No. 4,276,350 to Franz discloses a method for reducing the reactivity of a glass surface by blocking reactive sites such as silanol groups at the glass surface with a molecular layer of fluorocarbon. The method involves absorbing multivalent cations at the glass surface to provide anchoring sites for the chemisorption of otherwise nonreactive fluorocarbons.

U.S. Pat. No. 4,301,197 to Franz et al. discloses the formation of highly efficient release surfaces on glass substrates by treatment of the glass with poly alkyl hydrogen siloxane. The treated glass surface effectively releases such materials as polycarbonates, acrylics, and polyurethanes contacted in press polishing or laminating processes.

U.S. Pat. Nos. 4,983,459 and 4,997,684 to Franz et al. disclose a method and article wherein a glass surface is provided with a non-wetting surface by treatment with a perfluoroalkyl alkyl silane and a fluorinated olefin telomer.

SUMMARY OF THE INVENTION

The present invention provides a more durable glass surface with high water repellancy and high lubricity. The durability of the water and dirt repellancy of a glass surface is improved by applying a silica primer layer to the glass substrate prior to treating the surface with select fluorinated compounds. High water repellancy and high lubricity are provided by perfluoroalkylalkylsilanes which bond directly to the silica surface.

DESCRIPTION OF THE PREFERRED EMBODIMENT

Improved durability of rain and soil repellency provided by a perfluoroalkyl silane surface treatment of glass and glass-like surfaces is obtained by the use of a silica primer layer. In accordance with the present invention, the silica primer layer is preferably pyrolytically deposited, magnetron sputtered, or applied by a sol-gel condensation reaction (i.e., from alkyl silicates or chlorosilanes).

A perfluoroalkyl alkyl silane combined with a fluorinated olefin telomer produces the preferred surface treatment compositions of the present invention. The silane/olefin composition is preferably employed as a solution, preferably in a fluortnated solvent. The solution of the present invention is applied to a substrate surface by any conventional technique such as dipping, flowing, wiping or spraying. The solvent is evaporated and the composition forms a durable, non-wetting, lubricating surface. The use of a pyrolyric, sputtered or sol-gel deposited silica primer layer on the glass surface improves the humidity and ultraviolet radiation resistance of the silane surface treatment as measured by the Cleveland Condensing Cabinet and QUV (UVB-313) tests, indicating a longer useful product lifetime.

Preferred perfluoroalkyl alkyl silanes have the general formula $R_n R_m' SiX_{4-n-m}$, wherein R is a perfluoroalkyl alkyl radical, n is preferably 1, m=0 or 1, R' is an alkyl, preferably methyl, ethyl, vinyl or propyl, and X is preferably a radical such as acetoxy, halogen, and/or alkoxy. Preferred perfluoroalkyl radicals range from $CF_3$ to $C_{30}F_{61}$, preferably $C_6$ to $C_{18}$, and most preferably $C_8$ to $C_{12}$. R' is preferably methyl. Preferred radicals for X include chloro, bromo, iodo, methoxy, ethoxy and acetoxy radicals. Preferred perfluoroalkyl ethyl silanes in accordance with the present invention include perfluoroalkyl ethyltrichlorosilane, perfluoroalkyl ethyltriacetoxysilane, perfluoroalkyl ethyltrimethoxysilane, perfluoroalkyl ethyldichloro(methyl)silane and perfluoroalkyl ethyldiethoxy(methyl)silane. These perfluoroalkyl ethyl silanes appear to react with bonding sites at the substrate surface on a molecular basis. Polymerization and crosslinking of silane molecules at the glass surface may also occur.

Strong surface bonding of the perfluoroalkyl ethyl silanes produces a substrate surface which exhibits a high contact angle with a drop of water, indicating high water repellancy. The fluorinated olefin telomer, which does not on its own bond to the substrate surface, provides for delayed hydrolysis of the Si—X species to produce a durable surface via enhanced reactivity with the glass surface. Preferred olefin telomers have the general formula $C_m F_{2m+1} CH = CH_2$ wherein m may range from 1 to 30. The more preferred olefin telomers are a mixture of compounds of the above formula wherein m ranges from to 16, preferably 8 to 12.

Glass substrates include glass and glass-like surfaces such as abrasion resistant coatings on plastics. The glass may be annealed or tempered by chemical or thermal means. Clear, tinted, or coated glass may be treated. Coated glass includes antimony-tin oxide, doped tin oxide, transition metal oxides, or other coatings based upon an inorganic metal or oxide films. The surface treatment is further applicable to plastic surfaces with a glass-like protective coating. These coatings of the silicate sol-gel type generally contain silanes and inorganic oxides which function as a suitable substrate for the deposition of a hydrophobic coating, the durability of which is enhanced by the use of a primer.

The perfluoroalkyl alkyl silanes are preferably applied in solution. Suitable solvents include isopropanol, ethanol, hexane, heptane, methylene chloride, acetone, toluene and naphtha. Preferred solvents are fluortnated hydrocarbon solvents such as trichlorotrifluoroethane and perfluorinated organic compounds such as perfluorocarbons. Concentrations of about 0.005 to 5, preferably about 0.05 to 2.5, percent of each component are preferred, although concentrations may be up to 100 percent reactive silanes, i.e. solvent-free compositions.

The solvent is preferably evaporated simply by drying in air at ambient temperature. The composition may be cured by heating the treated surface. A cure cycle of about 200° F. (about 93° C.) for about 30 minutes is suitable. Higher temperatures and shorter heating times may be more efficient. A cure cycle of 2 to 5 minutes at 400° to 500° F. (about 204° to 260° C.) may be preferred, particularly about 3 minutes at about 470° F. (about 243° C.).

The contact angles recited herein are measured by the sessile drop method using a modified captive bubble indicator manufactured by Lord Manufacturing, Inc., equipped with Gaertner Scientific gontometer optics. The surface to be measured is placed in a horizontal position, facing upward, in front of a light source. A drop of water is placed on top of the surface so that the contours of the sessile drop can be viewed and the contact angle is measured through a goniometer telescope equipped with graduated circular protractor.

The use of a relatively thick (about 1000 Angstroms) pyrolytic silica primer layer, intermediate thickness (about 200 Angstroms) magnetron sputtered silica primer layer, or a thinner (about 100 Angstroms) sol-gel applied silica primer layer on the surface of ordinary clear, tinted or coated glasses and coated plastics increases the resistance of the silane surface treatment in accelerated weathering tests. With a pyrolytic silica primer, there is very little surface treatment durability difference between the air side and tin side of a float glass substrate. Both sides maintain a contact angle of 80° for more than 4000 hours of exposure in a Cleveland Condensing Cabinet, as opposed to 1200 hours for the air side and 300 hours for the tin side of unprimed float glass. The sol-gel applied silica from alkyl silicates (the more common alkyl silicates include tetraethyl orthosilicate and partially hydrolyzed/condensed mixtures which generally contain about 40 percent by weight silica) exhibits more modest durability improvements and further requires a firing step to partially densify the silica primer layer.

The use of a mixed oxide primer will be understood to be a variation of the primer composition. Materials suitable for mixture include halides, alkoxides, and carboxylates of alumina, titanium, zirconium, and sodium. The material is chosen so as to hydrolyze with moisture or pyrolyze at elevated temperatures to produce an oxide coating.

Various other materials suitable for the preparation of silica films include silicon tetrahalides (or partially hydrolyzed/condensed silicon haltdes, preferably chlorides), silicon tetracarboxylates (preferably acetate), and other silanes or polysiloxanes which will hydrolyze with atmospheric and physisorbed water or pyrolyze at elevated temperatures to produce a silica coating on a glass or glass-like surface. Sources of silica which do not readily hydrolyze are also suitable if a thin film of silica (or other inorganic oxide) can be prepared. Examples include tetraalkylammonium silicates, sodium silicates, and colloidal silicates. Variations which include other metal oxide salts or colloids are also useful.

The silicon tetrachloride or chlorosiloxane primers are also preferred since the application method requires simple methods and this primer can be applied to any glass surface (the subsequent heat treatment is not considered essential for all applications). Thus this primer can be put on tempered glass without decreasing the strength of the glass. Or conversely, the primer may be put on the glass surface prior to bending or tempering.

Suitable solvents for the primer depend on whether the silica precursor is intended to hydrolyze/condense or pyrolyze/condense on the glass surface. For hydrolyzing primers, anhydrous solvents such as perfluorocarbons, 1,1,2-trichlorotrifluoroethane, trichloroethane, methylene chloride, hydrocarbons, and other solvents without an active hydrogen are preferred. Most preferable are perfluorocarbons and hydrocarbons due to their inherent dryness and environmental considerations. Preferred solvents for pyrolyzable silica precursors include water and alcohols. Concentrations can range from about 0.01 to 100 percent by weight depending upon material and application method with a most preferable concentration range of 0.1 to 3 percent by weight.

The present invention will be further understood from the descriptions of specific examples which follow.

EXAMPLE 1

A primer consisting of 40 grams heptane and 1 gram silicon tetrachloride was wiped on a glass coupon quickly with a cotton pad (tin surface of Solarcool® coated gray tinted glass, 4.0 millimeters thick). A hydrophobizing mixture consisting of 80 grams FC-77 solvent from 3M and 2 grams perfluoroalkylethyltrichlorosilane (alkyl represents $C_6$–$C_{18}$ chain lengths) was then wiped over the surface. The glass coupon was exposed to moderate heat (300° F./15 minutes) and the excess was removed with solvent. Control coupons were also prepared without the primer.

These coupons were exposed to two weathering tests—Cleveland Condensing Cabinet (CCC, constantly condensing water vapor at 140° F.) and QUV (UVB-313 lamps, cycled with 8 hour UV light at 65° C. black panel temperature followed by 4 hours water vapor condensation at 50° C.). These test chambers are a product of The Q Panel Company. The efficiency of the treatment is measured by the contact angle formed by a sessile drop of water on the surface (readings are averaged). These results are reported in the following tables:

|  | Unprimed Control | Primed |
| --- | --- | --- |
| CCC hours |  |  |
| 0 | 112° | 113° |
| 190 | 113° | 113° |
| 424 | 101° | 113° |
| 592 | 41° | 112° |
| 760 |  | 110° |
| 920 |  | 102° |
| 1114 |  | 96° |
| 1368 |  | 80° |
| QUV hours |  |  |
| 0 | 111° | 115° |
| 238 | 107° | 115° |
| 421 | 104° | 113° |
| 724 | 94° | 108° |
| 1082 | 87° | 106° |
| 1415 | 82° | 105° |
| 1805 | 78° | 103° |
| 2205 | 66° | 101° |
| 2550 |  | 98° |
| 3097 |  | 90° |
| 3453 |  | 90° |

These results illustrate improved durability of the hydrophobic treatment with the application of a primer.

EXAMPLE 2

Primer solutions A and B are prepared consisting of 0.8 percent by weight silicon tetrachloride in FC-77, and 0.8 percent by weight hexachlorodisiloxane in FC-77 respectively. Hydrophobtzing solution consisted of 2.5 percent by weight perfluoroalkylethyltrichlorosilane (alkyl represents $C_6$–$C_{18}$ chain lengths) and 2.5 percent by weight perfluoroalkylethylene (alkyl represents $C_6-C_{18}$ chain lengths) in FC-77. Glass coupons (clear float, tin and atmosphere side, 4.9 millimeters thick) were precleaned with water and 50/50 by volume isopropanol/water prior to application of primer by wiping and subsequent application of hydrophobizing solution by wiping, heat treatment (300° F./15 min.), and solvent removal of excess material. The coupons (duplicate samples, multiple contact angle readings averaged) were weathered as described in Example 1. Data are reported in the following tables:

|  | Control | Primer A | Primer B |
|---|---|---|---|
| Tin Surface Results | | | |
| CCC hours | | | |
| 0 | 115° | 116° | 117° |
| 357 | 41° | 114° | 116° |
| 621 | 27° | 112° | 117° |
| 879 |  | 101° | 104° |
| 1159 |  | 67° | 78° |
| QUV hours | | | |
| 0 | 117° | 116° | 116° |
| 352 | 102° | 115° | 112° |
| 612 | 86° | 112° | 109° |
| 941 | 75° | 106° | 100° |
| 1249 | 74° | 102° | 90° |
| 1604 | 61° | 89° | 80° |
| 2056 |  | 80° | 63° |
| 2381 |  | 77° |  |
| 2759 |  | 72° |  |
| Atmosphere Surface Results | | | |
| CCC hours | | | |
| 0 | 115° | 115° | 117° |
| 357 | 109° | 113° | 116° |
| 621 | 73° | 97° | 112° |
| 879 | 44° | 63° | 107° |
| 1159 |  |  | 101° |
| 1320 |  |  | 94° |
| 1652 |  |  | 81° |
| QUV hours | | | |
| 0 | 116° | 118° | 117° |
| 352 | 114° | 116° | 114° |
| 612 | 110° | 113° | 114° |
| 941 | 102° | 110° | 109° |
| 1249 | 103° | 109° | 104° |
| 1604 | 90° | 104° | 98° |
| 2056 | 83° | 100° | 90° |
| 2381 | 74° | 90° | 78° |
| 2759 | 72° | 86° | 78° |

These results illustrate improved durability of the hydrophobic treatment with the application of either a silicon tetrachloride primer or a partially hydrolyzed-/oligomerized chlorosiloxane polymer.

EXAMPLE 3

The hydrophobizing solution described in Example 2 was used to coat a pyrolytic silica coated glass plate (clear float, 4.9 millimeters). Hydrophobizing solution was applied twice and the excess material was removed with solvent. The pyrolytic silica was coated on the glass surface as the glass was being manufactured and its thickness is of the order of 1000 Angstroms. This pyrolytic silica primer resulted in a very durable hydrophobic coating as is shown by the Cleveland Condensing Cabinet data (sessile water drop contact angle) below:

|  | Atmosphere Surface | | Tin Surface | |
|---|---|---|---|---|
| CCC hours | Unprimed | Pyrolytic Silica | Unprimed | Pyrolytic Silica |
| 0 | 100° | 106° | 100° | 91° |
| 239 | 100° | 101° | 99° | 102° |
| 497 | 108° | 106° | 41° | 105° |
| 664 | 104° | 101° |  | 100° |
| 903 | 89° | 100° |  | 100° |
| 1258 | 52° | 103° |  | 103° |
| 1449 |  | 94° |  | 97° |
| 1661 |  | 97° |  | 96° |
| 1826 |  | 96° |  | 94° |
| 2114 |  | 99° |  | 93° |
| 2421 |  | 96° |  | 90° |
| 2736 |  | 93° |  | 98° |
| 3573 |  | 85° |  | 82° |
| 4047 |  | 93° |  | 84° |
| 4456 |  | 89° |  | 90° |
| 4857 |  | 92° |  | 75° |
| 5456 |  | 85° |  | 74° |

EXAMPLE 4

A silica primer was formed by dip coating glass coupons in a solution as follows: 259 grams 2-propanol, 9.3 grams tetraethyl orthosilicate, and 1.9 grams tetramethylammonium hydroxide solution (25 percent by weight in methanol). The glass was dipped, held for a few seconds, and withdrawn at 6 inches (15.2 centimeters) per minute. The glass was heated to about 566° C. for minutes to remove the organics from the silica coating. The coated glass was treated with the hydrophobizing solution described in Example 2, heated to 200° F. (94° C.) for 1 hour, and solvent cleaned.

The coupons were weathered in the CCC and QUV chambers. The QUV test employed in this example used FS-40 lamps but the test conditions were otherwise similar to those described in Example 1. Contact angle data are reported below:

|  | Atmosphere Surface | | Tin Surface | |
|---|---|---|---|---|
|  | Unprimed | Sol-Gel Silica | Unprimed | Sol-Gel Silica |
| CCC hours | | | | |
| 0 | 109° | 108° | 107° | 102° |
| 264 | 103° | 108° | 55° | 105° |
| 427 | 98° | 107° |  | 104° |
| 742 | 86° | 109° |  | 98° |
| 1478 | 53° | sample broken |  | 67° |
| QUV hours | | | | |
| 0 | 100° | 109° | 101° | 105° |
| 193 | 110° | 113° | 105° | 111° |
| 349 | 110° | 110° | 99° | 106° |
| 708 | 100° | 106° | 77° | 95° |
| 1368 | 96° | 99° | 61° | 78° |
| 1815 | 98° | 94° |  | 74° |
| 2290 | 88° | 90° |  | 65° |
| 2596 | 88° | 84° |  | 65° |
| 2910 | 92° | 86° |  | 69° |
| 3091 | 94° | 91° |  | 76° |

An increase in durability is seen for the sol-gel silica primed samples over the unprimed controls.

EXAMPLE 5

The primer solution A and hydrophobizing solution in Example 2 were used to treat the tin surface of chemically tempered glass coupons. The primer solution was applied by wiping twice with a short, ambient wait between applications. After the hydrophobizing solution application, a heat cycle was employed (200° F. for 1 hour) and the coupons were cleaned with solvents.

These coupons and unprimed chemically tempered control coupons were tested as described in Example 1. The contact angle data are reported in the following tables:

| CCC hours | Unprimed | Primed |
|---|---|---|
| 0 | 118° | 120° |
| 350 | 109° | 118° |
| 702 | 97° | 117° |
| 1032 | 79° | 113° |
| 1556 | 75° | 96° |
| QUV hours | | |
| 0 | 120° | 119° |
| 344 | 103° | 117° |
| 698 | 87° | 109° |
| 1162 | 78° | 95° |
| 1559 | 72° | 94° |

This example shows improved durability of a hydrophobic treatment with a primer on a chemically tempered glass surface and also that the primer solution can be applied more than once.

EXAMPLE 6

Primer solution A consisting of 0.8 percent by weight silicon tetrachloride in FC-77, Primer B consisting of 3.0 percent by weight silicon tetrachloride in FC-77, and hydrophobizing solution consisted of 2.5 percent by weight perfluoroalkylethyltrichlorosilane (alkyl represents $C_6$–$C_{18}$ chain lengths) and 2.5 percent by weight perfluoroalkylethylene (alkyl represents $C_6$–$C_{18}$ chain lengths) in FC-77 were applied as in previous examples to clear float glass (tin side, 4.9 millimeters). A control sample set was left unprimed. Primer A was applied to two sample sets and one of these was heated to 540° C. and allowed to cool slowly to about 500° C. (about 10 minutes). Primer B was applied to another sample set and heat treated similarly. The hydrophobizing solution was used on all the samples with a 300° F./15 minute heat cycle and solvent cleanup. These samples were prepared in duplicate and the results were averaged.

These samples were weathered as described in Example 1. The degradation data are reported below:

| CCC hours | Unprimed | Primer A | Primer A-heated | Primer B-heated |
|---|---|---|---|---|
| 0 | 116° | 118° | 112° | 114° |
| 306 | 114° | 116° | 114° | 115° |
| 490 | 90° | 104° | 113° | 115° |
| 824 | 51° | 58° | 109° | 112° |
| 1016 | | | 106° | 112° |
| 1275 | | | 91° | 108° |
| 0 | 115° | 116° | 115° | 116° |
| 320 | 112° | 116° | 114° | 110° |
| 838 | 91° | 109° | 104° | 97° |
| 1253 | 80° | 103° | 95° | 87° |

These data show the primer increases the durability of the hydrophobic treatment and that heat cycles and primer concentration can affect the durability.

EXAMPLE 7

A silica primer was applied to a glass surface (clear float, 5.8 millimeters, both tin and atmosphere side samples prepared) by magnetic sputter vapor deposition (MSVD) techniques using a silicon alloy cathode. The silica coating is about 210 Angstroms thick and has a neutral appearance. The hydrophobizing solution in Example 2 was used to treat the MSVD silica primer surface followed by a 300° F./15 minute heat treatment and solvent cleanup. A similarly hydrophobized clear float sample (tin surface, 4.9 millimeters) without primer is included for comparison. These samples were prepared in duplicate.

These samples were weathered as described in Example 1. The degradation data (averaged) are reported below:

| CCC hours | Unprimed (tin) | MSVD Silica (tin) | MSVD Silica (atm.) |
|---|---|---|---|
| 0 | 116° | 120° | 120° |
| 306 | 114° | 118° | 118° |
| 490 | 90° | 112° | 113° |
| 824 | 51° | 92° | 104° |
| 1016 | | 75° | 91° |
| 1275 | | 62° | 85° |
| 0 | 115° | 120° | 122° |
| 320 | 112° | 118° | 120° |
| 838 | 91° | 112° | 115° |
| 1253 | 80° | 107° | 114° |

These samples illustrate improved durability with MSVD silica primers.

EXAMPLE 8

Primer A and hydrophobizing solutions described in Example 2 were applied to antimony-tin oxide and fluorine-doped tin oxide coated glass substrates. Unprimed controls were also treated with the hydrophobizing solution. All glass samples were precleaned by polishing with a slurry of cerium oxide and water and were cleaned after treatment with solvents.

These samples were weathered as described in Example 1. The degradation of contact angle data (averaged) are reported below:

| QUV hours | Unprimed ATO | Primer/ATO | Unprimed NESA | Primer/NESA |
|---|---|---|---|---|
| 0 | 117° | 117° | 117° | 117° |
| 352 | 66° | 113° | 37° | 110° |
| 612 | 46° | 110° | | 110° |
| 941 | | 109° | | 105° |
| 1249 | | 109° | | 95° |
| 1604 | | 98° | | 94° |
| 2056 | | 93° | | 81° |
| 2381 | | 84° | | 83° |
| 2760 | | 80° | | 83° |

These data indicate increased durability with the primer for oxide coatings on glass.

EXAMPLE 9

Primer solution comprising 40 grams heptane and 1 gram silicon tetrachloride was used to prime metal oxide coated gray glass 5 millimeters thick on the tin side by wiping and spraying techniques. The primer coating was heat treated for 10 minutes at 300° F. These samples and a control sample were hydrophobized with a solution of 20 grams heptane, 20 grams acetone, and 1 gram perfluoroalkylethyltriacetoxysilane (alkyl represents $C_6$–$C_{18}$ chain lengths). These samples were heat treated at 200° F./1 hour.

These samples were weathered in the CCC chamber previously described. The data follow:

| CCC hours | Unprimed | Wiped Primer | Sprayed Primer |
|---|---|---|---|
| 0 | 110° | 112° | 111° |
| 240 | 30° | 110° | 101° |
| 502 |  | 108° | 98° |
| 1100 |  | 53° | 41° |

These data indicate the use of other solvents, an acetoxysilane hydrophobizing agent, and spray application.

EXAMPLE 10

Coupons of clear float glass (tin surface, 4.7 millimeters) were treated with a selection of primers containing all silica, 91% silica/9% titania, and 85% silica/15% titania. The mixtures were as follows:

Primer A: 49 grams heptane and 1.0 gram silicon tetrachloride
Primer B: 49 grams heptane and 0.95 gram silicon tetrachloride and 0.06 gram titanium isopropoxide
Primer C: 52 grams heptane and 0.96 gram silicon tetrachloride and 0.11 gram titanium isopropoxide The primer solutions were wiped on the surfaces without heat treatment followed by the hydrophobization treatment described in Example 2. The hydrophobic treatment was cured at 300° F for 15 minutes, and upon cooling was cleaned with solvents.

These coupons (in duplicate for the primed samples) along with an unprimed control were tested in CCC and QUV (UVB-313 lamps) as described previously. The data follow:

|  | Unprimed | Primer A | Primer B | Primer C |
|---|---|---|---|---|
| CCC hours |  |  |  |  |
| 0 | 110° | 109° | 108° | 109° |
| 184 | 86° | 105° | 70° | 40° |
| 446 | 48° | 77° | 33° | 21° |
| QUV hours |  |  |  |  |
| 0 | 110° | 110° | 110° | 111° |
| 357 | 95° | 106° | 103° | 99° |
| 724 | 75° | 105° | 98° | 87° |
| 1081 | 61° | 100° | 86° | 84° |
| 1465 | 59° | 96° | 82° | 71° |
| 1807 |  | 95° | 81° |  |
| 2208 |  | 89° | 75° |  |

These data show increased durability with the all silica primer. The mixed results for the silica/titania mixtures indicate different breakdown mechanisms are possible.

EXAMPLE 11

Solution A is prepared comprising 0.8 percent by weight silicon tetrachloride in FC-77. Solution B is prepared comprising 2.5 percent by weight perfluoroalkylethyltrichlorosilane, 2.5 percent by weight perfluoroalkylethylene and 95 percent by weight FC-77.

Plastic coupons were prepared from stretched acrylic which was coated with a silane-type abrasion resistant coating. Coated plastic coupons were contacted with Solution A by wiping with a cotton pad. One coupon was left unprimed, another used one pass of primer, and a third used five passes. The samples were then treated by wiping with Solution B on a cotton pad. After treatment the excess material was removed with solvents.

The coupons were exposed to Cleveland Condensing Cabinet as described in Example 1 (readings are averaged). These results are reported in the following table:

| CCC hours | Singly Primed | 5x Primed | CCC hours | Unprimed Control |
|---|---|---|---|---|
| 0 | 103° | 115° | 0 | 111° |
| 120 | 96° | 117° | 121 | 102° |
| 187 | 98° | 112° | 365 | 91° |
| 287 | 95° | 111° | 698 | 93° |
| 377 | 98° | 115° | 1130 | 79° |
| 641 | 95° | 108° | 1603 | 74° |
| 884 | 93° | 106° | 2079 | 75° |
| 1217 | 87° | 105° |  |  |
| 1650 | 80° | 104° |  |  |
| 2122 | 79° | 96° |  |  |
| 2599 | 65° | 79° |  |  |

The initial contact angle of the untreated abrasion resistant coating was 77°. In summary the estimated test duration to the original contact angle is: Unprimed=1319 hours; singly primed=2190 hours; and 5× primed >2600 hours.

EXAMPLE 12

Solution A and solution B were prepared as in Example 11.

Lexan MR5 plastic (polycarbonate from GE) was used as the substrate. The coated plastic coupon was contacted with Solution A by wiping with a cotton pad. One coupon was left unprimed and another used five passes of primer. The samples were then treated by wiping with Solution B on a cotton pad. After treatment the excess material was removed with solvents. The coupons were exposed to Cleveland Condensing Cabinet as in Example 1. These results are reported in the following table:

| CCC hours | 5x Primed | CCC hours | Unprimed Control |
|---|---|---|---|
| 0 | 111° | 0 | 107° |
| 120 | 108° | 121 | 101° |
| 187 | 107° | 365 | 83° |
| 287 | 101° | 698 | 86° |
| 377 | 111° | 1130 | 83° |
| 641 | 105° | 1603 | 77° |
| 884 | 99° | 2079 | 70° |
| 1217 | 101° |  |  |
| 1650 | 103° |  |  |
| 2122 | 90° |  |  |
| 2599 | 91° |  |  |

The initial contact angle of the untreated abrasion resistant coating was 85°. In summary, the estimated test duration to the original contact angle is: Unprimed roughly=300–800 hours and 5× primed >2600 hours.

The above examples are offered to illustrate the present invention. Various perfluoroalkyl silanes, fluorinated olefin telomers, solvents and concentrations may be applied by any conventional technique, and cured at suitable temperatures for adequate times to provide durable non-wetting surfaces. Silica primer layers may be deposited by any conventional technique such as pyrolyric spray, chemical vapor deposition, magnetron sputtering or sol-gel (wipe, spray, dip, flow coating). The treated substrates of the present invention are especially suitable in automobile and aircraft parts as well as in building components. The scope of the present invention is defined by the following claims.

I claim:

1. An article comprising a glass substrate at least a portion of the surface of which is treated with:
   a. first a silica primer layer; and
   b. second a perfluoroalkyl alkyl silane layer over the silica primer layer.

2. An article according to claim 1, wherein said perfluoroalkyl alkyl silane is selected from compounds having the general formula $R_nR'_mSiX_{4-n-m}$, wherein R is a perfluoroalkyl alkyl radical, R' is an alkyl radical, n is one, m is less than or equal to one, and X is a radical selected from the group consisting of halogen, alkoxy and acetoxy radicals, and is combined with a fluorinated olefin telomer.

3. An article according to claim 1, wherein said perfluoroalkyl radical is selected from the group consisting of $CF_3$ to $C_{30}F_{61}$.

4. An article according to claim 3, wherein said perfluoroalkyl radical is selected from the group consisting of $C_6F_{13}$ to $C_{16}F_{33}$.

5. An article according to claim 4, wherein said perfluoroalkyl radical is selected from the group consisting of $C_8F_{17}$ to $C_{10}F_{21}$.

6. An article according to claim 2, wherein R' is selected from the group consisting of methyl, ethyl, vinyl and propyl.

7. An article according to claim 2, wherein X is selected from the group consisting of chloro, iodo, bromo, methoxy, ethoxy and acetoxy.

8. An article according to claim 2, wherein said perfluoroalkyl alkyl silane is selected from the group consisting of perfluoroalkyl ethyltrtchlorosilane, perfluoroalkyl ethyltrtacetoxysilane, perfluoroalkyl ethyltrimethoxysilane, perfluoroalkyl ethyl dichloro(ethyl)silane and perfluoroalkyl ethyldiethoxy(methyl)silane, wherein said fluorinated olefin telomer is selected from the group consisting of $C_mF_{2m+1}CH=CH_2$, wherein m is from 1 to 30.

9. An article according to claim 8, wherein m is from 1 to 16.

10. An article according to claim 9, wherein m is from 4 to 10.

11. A method of producing a non-wetting surface on a glass substrate comprising the steps of:
   a. depositing a silica primer layer on a surface of the glass; and
   b. contacting the silica primer layer with a composition comprising a perfluoroalkyl alkyl silane.

12. A method according to claim 11, wherein said perfluoroalkyl alkyl silane is selected from compounds having the general formula $R_nR'_mSiX_{4-n-m}$, wherein R is a perfluoroalkyl alkyl radical, R' is an alkyl radical, n is one, m is equal to or less than one, and X is a radical selected from the group consisting of halogen, alkoxy and acetoxy radicals, and is combined with a fluorinated olefin telomer.

13. A method according to claim 11, wherein the step of depositing a silica primer layer is accomplished by pyrolysis of a silicon-containing compound on the substrate surface to form silica.

14. A method according to claim 11, wherein the step of depositing a silica primer layer is accomplished by sputtering a silicon-containing target in an oxygen-containing atmosphere to deposit a silica-containing film on the substrate surface.

15. A method according to claim 11, wherein the step of depositing a silica primer layer is accomplished by applying to the substrate surface a solution of a hydrolyzable silicon-containing compound which hydrolyzes and condenses to form a silica-containing film on the substrate surface.

16. A method according to claim 12, wherein said perfluoroalkyl radical is selected from the group consisting of $CF_3$ to $C_{30}F_{61}$.

17. A method according to claim 16, wherein said perfluoroalkyl alkyl silane is selected from the group consisting of perfluoroalkyl ethyltrichlorosilane, perfluoroalkyl ethyltriacetoxysilane, perfluoroalkyl ethyltrimethoxysilane, perfluoroalkyl ethyldichloro(methyl)silane and perfluoroalkyl ethyldiethoxy(methyl)silane, wherein said fluorinated olefin telomer is selected from the group consisting of $C_mF_{2m+1}CH=CH_2$, wherein m is from 1 to 30.

18. A method according to claim 16, wherein R' is selected from the group consisting of methyl, ethyl, vinyl and propyl.

19. A method according to claim 18, wherein X is selected from the group consisting of chloro, iodo, bromo, methoxy, ethoxy and acetoxy.

20. A method according to claim 19, wherein m is from 4 to 10.

* * * * *